(12) United States Patent
Demarest

(10) Patent No.: US 11,539,117 B1
(45) Date of Patent: Dec. 27, 2022

(54) BODY AREA NEAR FIELD ANTENNA SYSTEM

(71) Applicant: Tyson Alexander Demarest, East Providence, RI (US)

(72) Inventor: Tyson Alexander Demarest, East Providence, RI (US)

(*) Notice: Subject to any disclaimer, the term of this patent is extended or adjusted under 35 U.S.C. 154(b) by 0 days.

(21) Appl. No.: 17/395,493

(22) Filed: Aug. 6, 2021

(51) Int. Cl.
*H01Q 1/27* (2006.01)
*H01Q 7/00* (2006.01)
*H04B 5/00* (2006.01)

(52) U.S. Cl.
CPC ............... *H01Q 1/276* (2013.01); *H01Q 7/00* (2013.01); *H04B 5/0031* (2013.01)

(58) Field of Classification Search
CPC ........... H01Q 1/273; H01Q 1/276; H01Q 7/00
See application file for complete search history.

(56) References Cited

U.S. PATENT DOCUMENTS

2018/0289279 A1* 10/2018 Ren .................... A61B 5/369
2019/0157748 A1* 5/2019 Ozden .................. H01Q 9/42

* cited by examiner

*Primary Examiner* — Hoang V Nguyen

(57) ABSTRACT

The present invention comprises an antenna system consisting of two generally co-axial near field antennas, one mounted around the circumference of a human head, the other mounted on the body. The preferred embodiment discloses the dimensions necessary to create a viable near field communications (NFC) channel with existing commercial off-the-shelf (COTS) NFC circuits to create a secure wireless link between the head and shoulders.

2 Claims, 3 Drawing Sheets

BODY AREA NEAR FIELD ANTENNA SYSTEM

FIELD OF THE INVENTION

The present disclosure relates generally to wireless communications systems and antenna structures, and more particularly to body-mounted wireless communications systems that replace corded connections between electronic components mounted on different parts of the body.

BACKGROUND

Advanced military forces and law enforcement officers operate individual audio headset systems, consisting of headphones and a microphone. Frequently these headset systems are connected by an audio cable to a personal radio transceiver. In this configuration, the headset audio cable hangs from the headset, routes through personal equipment, and typically connects to a vest-mounted push-to-talk (PTT) module, which in turn connects to the radio transceiver. This audio cable is inconvenient and dangerous. The cable typically must be routed through equipment every time the headset is removed and replaced, and the cable can be inadvertently routed through, for example, a weapon sling, a vehicle restraint system, or parachute equipment. When the headset cable is pulled out of the PTT by accident, radio or intercom communication ceases, and the operator is faced with the necessary task of replacing the cable, potentially while performing higher priority actions, such as returning fire or providing overwatch.

Wireless radio technologies for civilian applications based on Bluetooth®, operating in the 2.4 GHz band of the electromagnetic spectrum, have been employed to remove wired audio connections, especially those between audio headsets and cellular phones. However, Bluetooth and many other wireless technology standards are highly susceptible to detection and direction-finding (DF) from distances as far as 1000 meters, making them dangerous to military and law enforcement units which require minimal RF signature.

In addition to DF threats, wireless technologies that use far-field radiation, such as Bluetooth and wireless fidelity (Wi-Fi), also suffer from threats of eavesdropping, data corruption (effectively denial of service), data modification, data insertion, and man-in-the-middle attacks from a much greater range than near-field technologies.

In contrast to wireless methods employing far-field radio frequency propagation, Near Field Communication (NFC) is a set of communication protocols that employ two inductively coupled antennas that operate within a range significantly less than one wavelength of the propagation frequency. Typically, NFC systems operate with two loop antennas in a point-to-point topology, as opposed to a network topology in Bluetooth or Wi-Fi systems. NFC transmissions effectively form an air-core transformer, where the initiating NFC device is air gapped from a second, typically passive, target device. NFC devices typically operate in the unlicensed Industrial Scientific and Medical (ISM) radio frequency band centered at 13.56 MHz with 14 kHz of bandwidth.

Although transmission range for typical NFC applications such as proximity cards is roughly 4 cm to 8 cm, the point-to-point range is limited merely by the degree and quality of inductive coupling between the two antennas. The physical properties of the two antennas and their position relative to one another determine the mutual inductance. The area of the surface enclosed by an inductive antenna structure is a primary factor in predicting the transmission and detection range of a near field communication system.

As discovered through original experimentation, the present invention discloses that the unique geometry of the human body affords a solution to creating a wireless head-to-body communications channel with near field antenna coils. When a first antenna coil is mounted on the circumference of a wearer's head, and the second antenna coil is mounted around the wearer's shoulders, the maximum range of the NFC channel in peer-to-peer transmission mode, as is preferable in the present disclosure, meets or exceeds the distance between the two antennas. Thus a near field communications channel incorporating the presently disclosed antenna system has been observed to transmit and receive data with sufficient bandwidth to support a wireless audio application.

In summary, tactical exposure of RF transmission and the limitations of existing near field technologies have complicated the removal of a dangerous, inconvenient audio cable between an audio headset and a chest-mounted radio. The present antenna system and related method disclose a novel low threat system for satisfying the need for this audio cable without unacceptable risk of detection or other tactical threats.

BRIEF SUMMARY OF THE INVENTION

The present invention is directed to a near field antenna system for secure, wireless communication between a person's head and chest. A preferred embodiment includes a system of two inductively coupled antennas, one mounted around the circumference of the head, preferably attached to a helmet, and the other loop mounted around the neck on the base of the shoulders, preferably attached to the top of a vest. The design of this antenna system is significantly constrained by the physical transmission properties of near field communications (NFC), the geometries of the human body, and the properties of common NFC integrated circuits; however, the present disclosure and preferred embodiment detail how to overcome such constraints for a viable NFC channel between the head and body.

This invention thus provides the antenna structures necessary to perform near field communications (NFC) between the head and body. This invention includes antenna structure systems designed as disclosed but using any form of near field transmission scheme. This invention also includes each individual part of the system, namely both Part 1, the Headset Antenna, and Part 2, the Body Antenna, when used as a part of the combined antenna system disclosed herein.

BRIEF DESCRIPTION OF THE DRAWINGS

Further description of the features and advantages of the immediate disclosure will appear in the following detailed description, taken in combination with the appended drawings, in which.

DETAILED DESCRIPTION AND BEST MODE OF IMPLEMENTATION

Figure 1:
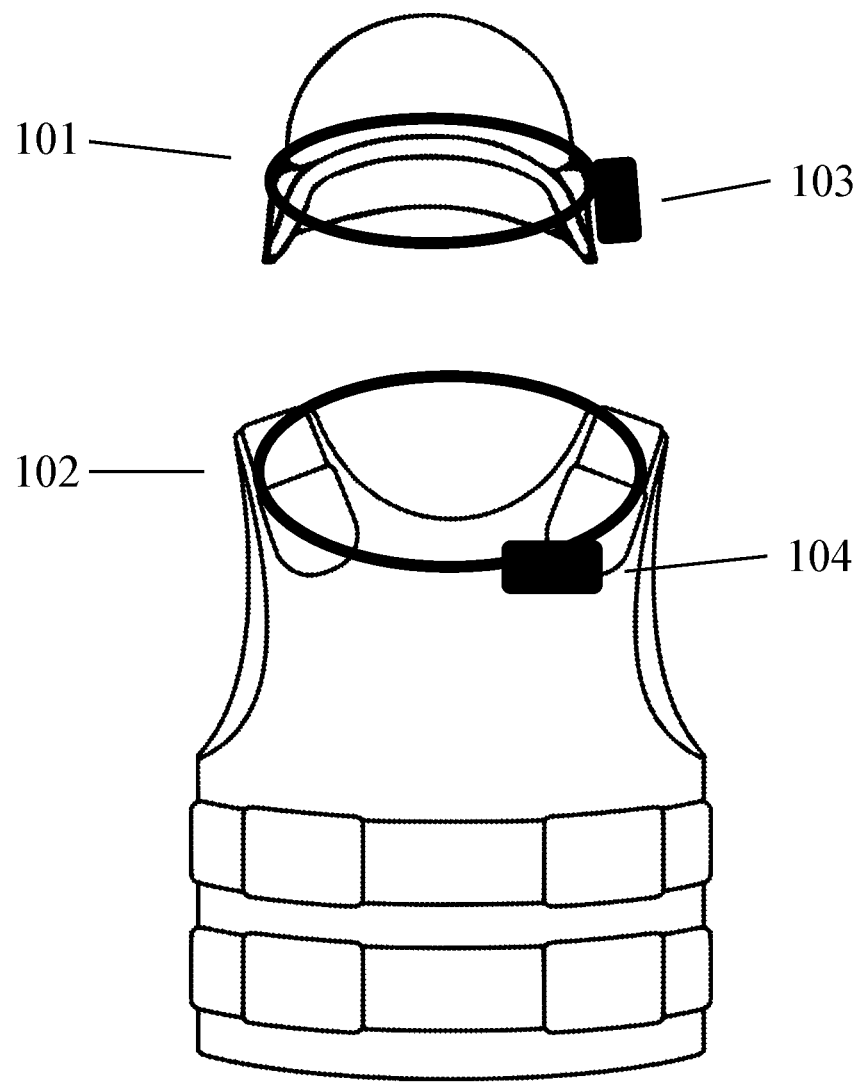
FIG. 1 shows a first aspect of the antenna system diagram in the preferred embodiment mounted on a military-style helmet and body armor vest.

In the appended drawings, like features are identified by like reference numerals and letters.

The following description provides details of a preferred embodiment of the antenna system claimed herein. Many details are provided to explain the present invention; however, it will be understood by those skilled in the art that the presently disclosed subject matter may be practiced without these specific details.

The preferred embodiment of the antenna system consists of two parts as follows: 1) Headset Antenna and 2) Body Antenna. Each antenna is preferably constructed of a single turn of 18 American Wire Gauge (AWG) insulated solid core copper wire; however, variations of materials and wire gauges may afford the electrical properties necessary to inductively couple the two antennas without exceeding the limitations of the NFC driving components. Each antenna coil is contoured in such a way to be affixed generally parallel to the transverse plane of the human body, where in the preferred embodiment the headset antenna is wound along the brim of a helmet and the body antenna is preferably routed along the shoulder straps and collar of a body armor vest. See FIG. 1, References 101 and 102. The preferred embodiment is the product of significant experimentation with various placements and materials to create a feasible NFC channel. The below paragraphs describe the design constraints and the derivation of the current best mode embodiment from the constraints.

The transmission range of an NFC channel depends on a coupling factor k between two antennas. The coupling coefficient is the fraction of magnetic flux created by one antenna that influences a second antenna. The coupling factor k depends on the mutual inductance of the two antennas as well as each antenna's self-inductance as in the following equation.

$$k = \frac{M}{\sqrt{L_{01}L_{02}}}$$

where, in the case of the present disclosure, $L_{01}$ and $L_{02}$ are the self-inductances of headset and body antenna coils, respectively, and M is the mutual inductance between them.

Figure 2:
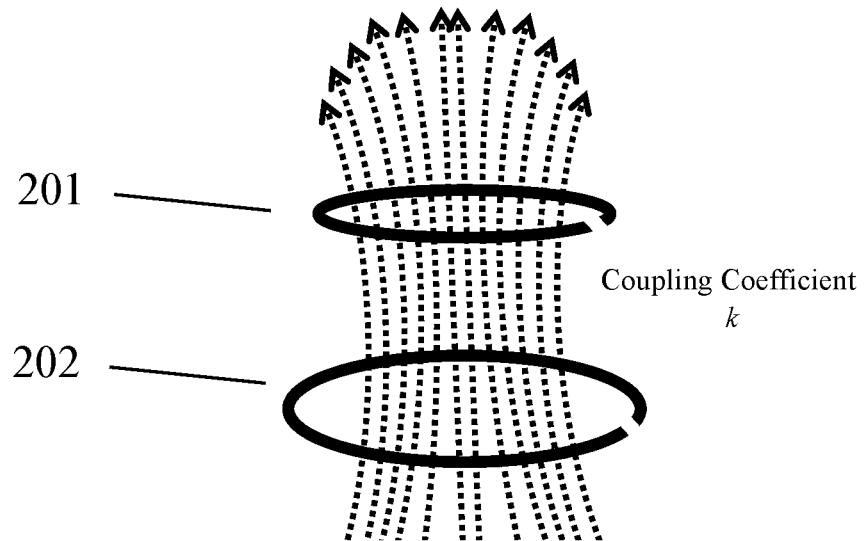
FIG. 2 illustrates the coupling coefficient k between the two antennas as a function of the magnetic field produced and, consequently, mutual inductance.

Thus, in addition to the self-inductances, the coupling coefficient k of the antenna system depends on several factors equating to mutual inductance. These factors include the relative permeability of the wireless space, the radii of both antennas, as in the present case of idealized circular antenna coils, and the number of turns in each loop antenna coil. The following equation describes the coupling coefficient k in terms of all of these factors when the two antennas, simplified to be circular, are co-axial, i.e. parallel and sharing a common axis through each's center, and separated by a distance x in meters.

$$k = \mu_0 \frac{\pi r_{01}^2 r_{02}^2 N_{01} N_{02}}{2\sqrt{(r_{01}^2 + x^2)^{3/2}}} \frac{1}{\sqrt{L_{01}L_{02}}}$$

where $r_{01}$ is the radius of the first antenna coil in meters, $r_{02}$ is the radius of the second antenna coil in meters, $\mu_r$ is the relative permeability of the wireless space, $N_{01}$ is the number of turns of the first antenna coil, and $N_{02}$ is the number of turns of the second antenna coil. See FIG. 2 for an illustration of the coupling factor.

A minimum coefficient of coupling k must be achieved for commercial off-the-shelf (COTS) NFC equipment to adequately detect a signal between each antenna. In practice a coupling coefficient of approximately 0.04 is sufficient and provides a framework to design the antenna system. Thus, the minimum k is attained by satisfying the physical constraints provided in the preceding paragraph.

The magnetic permeability of the wireless space $\mu_{0_r}$ is a near-constant, known value. For the purposes of the present disclosure and with a successful inductive coupling, the value of $\mu_0$ can be approximated to be that of water, which is $1.256627 \times 10^{-6}$ H/m.

The dimensions of a typical human body were discovered through experimentation to provide the antenna geometry needed for a near field communications channel that can span the distance between the brim of a head and shoulders, hereafter approximated to be 15 cm for the preferred embodiment. Other generalized measurements of an adult human body were used to further constrain the equation for the coupling factor k: a head circumference of 90 cm and a loop length of 120 cm around the top of the shoulders and chest. With such a geometry approximately fixed, the antenna coil radii $r_{01}$, $r_{02}$ and transmission distance x of the equation for the coupling factor are therefore known. The problem of designing of a viable head-to-body NFC antenna system then becomes a matter of discovering antennas with self-inductances and turn numbers that provide a viable coupling coefficient k.

Further constraining the design of the preferred embodiment, applications of the presently disclosed antenna system are intended, but not required, to be immediately interoperable with existing COTS NFC integrated circuits (ICs) that have transmission power limitations. Depending on the NFC IC chosen, the maximum transmission current of each antenna radiator could be between 150 mA and 350 mA, typically at 3.3 V. The greater number of turns of each antenna in the preferred configuration is confirmed by original experimentation to increase both impedance and inductance. In order to minimize power consumption as needed to be useful in an application with COTS ICs and to provide useful mutual inductance M, the number of turns in the preferred embodiment is limited one (1) turn for both the headset and body antennas.

Thus, the self-inductance of each loop, $L_{01}$ and $L_{02}$ remain as the free parameters contributing to a viable coupling coefficient. The selection of the loop material further constrains these values in the preferred embodiment. The presently disclosed antenna system is intended to be useful for a human to carry and to mount quickly and easily on his or her head and shoulders. The materials used in the preferred antennas must necessarily be malleable and light-weight. Several materials were considered, with solid-core copper wire chosen as the most viable in the preferred embodiment. The diameter of the solid copper core, especially in the disclosed geometric configuration, also influences the self-inductance of each antenna. After experimentation, 18 American Wire Gauge (18 AWG, approximately 1.02 mm diameter) solid-core copper wire was discovered to provide a self-inductance of 1120 nH in the 90 cm headset antenna, and a self-inductance of 1490 nH in the 120 cm body antenna. With the geometrical constraints of the preferred embodiment previously disclosed, the theoretical coefficient of coupling k would be 0.036, which in practice is sufficient to create a viable NFC channel. The preferred embodiment thus provides a basis for successful wireless near-field communications between the head and body. The paragraphs below describe the drawings in greater detail and discuss considerations for other embodiments of the present disclosure.

Part 1, as depicted in FIG. 1, Feature 101, relates a first antenna loop mounted around the circumference of the wearer's head. In the preferred embodiment, this single loop is constructed of 18 AWG solid copper core wire with an insulating sheath. Preferably the headset antenna loop length is approximately 90 cm in length; however, other embodiments may allow for the length of the headset loop to be tailored to the size of the circumference of the wearer.

Part 2, as depicted in FIG. 1, Feature 102, relates to a second antenna loop mounted on the wearer's shoulders, preferably affixed to the top of a vest. In the preferred embodiment, this single loop is also constructed of 18 AWG solid copper core wire with an insulating sheath. Preferably the headset antenna loop length is approximately 120 cm in length; however, other embodiments may allow for the length of the headset loop to be tailored to the size of the circumference of the wearer.

In another embodiment, wire materials other than solid-core copper may be used. These include but are not limited to steel, stranded copper, copper-covered steel, stainless steel, bare copper, tinned copper, silver-coated copper, and alloys.

In another embodiment, each antenna element may employ more than one (1) turn.

In another embodiment, the headset antenna may be contoured to conform to the head itself or to be mounted to any other form of headgear including but not limited to a hat or medical sensor cap.

In another embodiment, the body antenna may be contoured to conform to the body itself or to be affixed to clothes or any other garment warn on the chest in such a way that the body antenna rests in the disclosed configuration.

Figure 3:
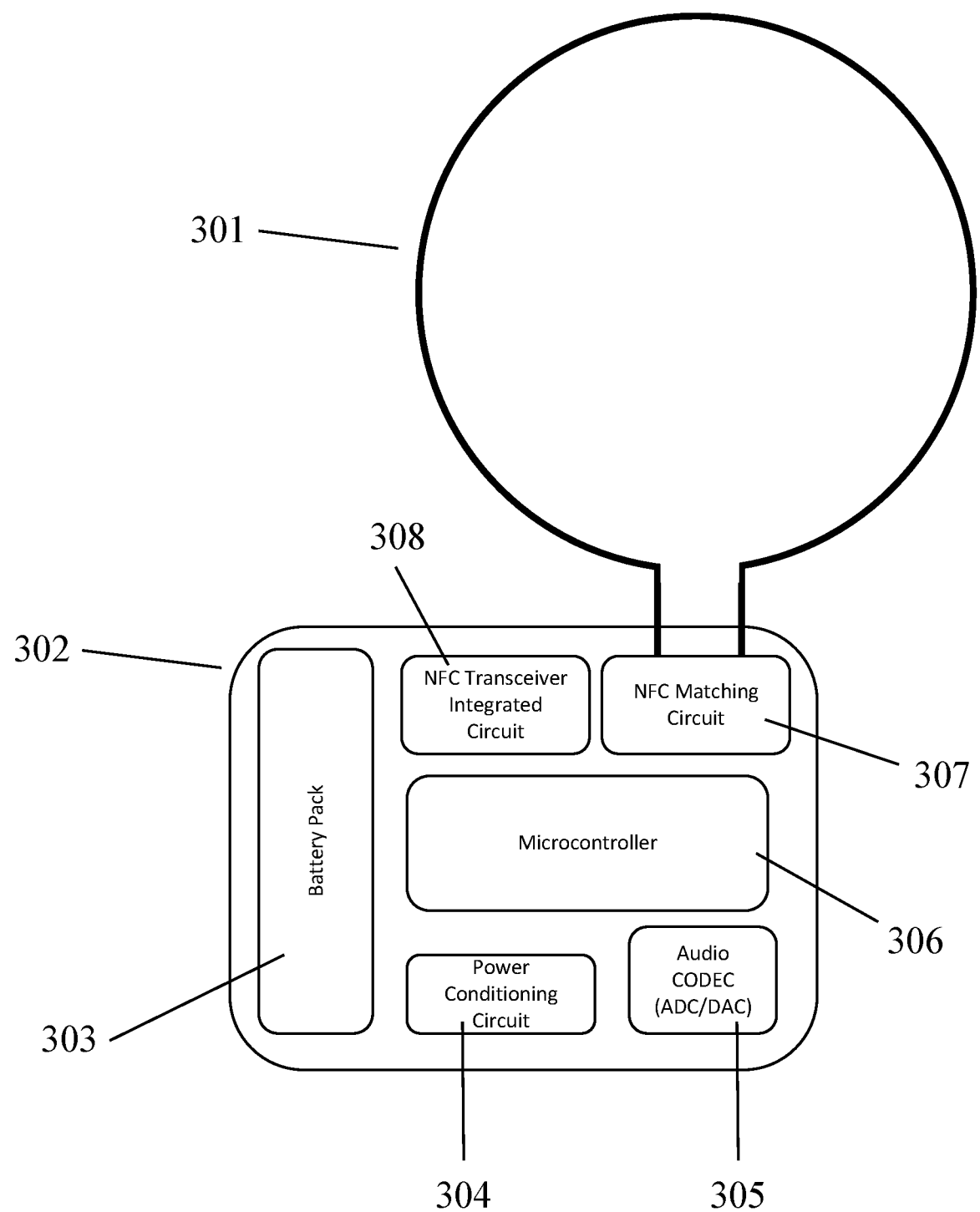
FIG. 3 shows the one antenna loop as a component of a wireless NFC audio module and the other components in such an application.

The present invention enables the application of secure, NFC-based audio between a wearer's head and body. FIG. 1, Features 103 and 104, and FIG. 3 as a whole are provided as illustrations of such an application. Features 103 and 104 show roughly the placement of battery-powered, enclosed electronic modules driving the disclosed antenna system. FIG. 3 provides a more detailed system view of such a module without loss of generality regarding placement on the head or body. Feature 301 illustrates, not to scale, one of the two antenna coils disclosed herein, again without loss of generality regarding placement on the head or body. Feature 302 shows an enclosing structure of the module. Features 303 and 304 show a battery pack and an accompanying power conditioning sub-circuit. Such a power conditioning sub-circuit may be used to prevent damage to the rest of the circuit and to increase or decrease the battery pack's voltage to the voltage required by the rest of the circuit. Feature 305 describes an audio codec IC used to digitally sample audio data and produce an analog audio signal from audio data. Feature 306 shows a general-purpose microcontroller IC used both to control the audio codec drawn in Feature 305 and the NFC IC drawn in Feature 308. Feature 308 shows an IC capable of transmitting and receiving an NFC signal. Feature 307 shows a sub-circuit designed to impedance match the NFC IC in Feature 308 with the antenna coil, as constructed in the disclosed configuration.

Thus, the present disclosure provides an antenna system capable of enabling near-field communications between a wearer's head and shoulders.

What is claimed is:

1. An antenna system, the system comprising:
   a first antenna coil affixed around the circumference of a person's head so that the plane formed by the antenna coil is generally parallel to the ground when the person is standing in the anatomical position; and
   a second antenna coil that is inductively coupled to the first antenna coil and affixed to the person's body at or below the shoulders and parallel to the first antenna coil,
   wherein the antenna coils are configured to intercommunicate using an NFC protocol and to operate at frequencies between 12.56 MHz and 14.56 MHz.

2. The system of claim 1, wherein the antenna coils are formed from electrically conductive metal wires.

* * * * *